United States Patent
Burns et al.

(10) Patent No.: US 8,904,191 B2
(45) Date of Patent: Dec. 2, 2014

(54) MULTIPLE CONTENT PROTECTION SYSTEMS IN A FILE

(75) Inventors: Quintin Swayne Burns, Fort Mill, SC (US); Robert Kilroy Hughes, Jr., Seattle, WA (US); John Carl Simmons, North Bend, WA (US); Scott J. Fierstein, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 525 days.

(21) Appl. No.: 12/485,949

(22) Filed: Jun. 17, 2009

(65) Prior Publication Data

US 2010/0185854 A1    Jul. 22, 2010

Related U.S. Application Data

(60) Provisional application No. 61/146,099, filed on Jan. 21, 2009.

(51) Int. Cl.
  G06F 11/30 (2006.01)
  G06F 21/10 (2013.01)

(52) U.S. Cl.
  CPC ........ *G06F 21/10* (2013.01); *G06F 2221/0728* (2013.01)
  USPC ........................................................ 713/193

(58) Field of Classification Search
  CPC .............................. G06F 21/6209; H04L 9/12
  USPC ........................................................ 713/193
  See application file for complete search history.

(56) References Cited

U.S. PATENT DOCUMENTS

| 7,120,250 B2 | 10/2006 | Candelore |
| 7,336,787 B2 | 2/2008 | Unger et al. |
| 7,480,382 B2 | 1/2009 | Dunbar et al. |
| 7,555,464 B2 | 6/2009 | Candelore |
| 7,680,804 B2 * | 3/2010 | Upendran et al. ......... 707/999.1 |

(Continued)

FOREIGN PATENT DOCUMENTS

| JP | 2005-538453 A | 12/2005 |
| JP | 2007-220139 A | 8/2007 |
| WO | 2007094588 A1 | 8/2007 |

OTHER PUBLICATIONS

"International Search Report", Mailed Date: Jul. 22, 2010, Application No. PCT/US2009/069332, Filed Date: Dec. 22, 2009, pp. 8.

(Continued)

*Primary Examiner* — Mohammad W Reza
(74) *Attorney, Agent, or Firm* — Timothy Churna; Kate Drakos; Micky Minhas

(57) ABSTRACT

Supporting a plurality of content protection systems in a single container file. The protection systems share an encryption method which is accessible from a sample encryption box in the file. Each of the protection systems stores, in a protection system header box, information for decrypting the content in accordance with the corresponding protection system. In some embodiments, separate protection system header boxes in the file correspond to each of the protection systems. By using the common encryption method and sharing encryption expressions across the protection systems, the multiple content protection systems are supported in the file without creating additional copies of the content. In some embodiments, aspects of the disclosure extend the International Organization for Standardization (ISO) base media file format to support multiple digital rights management (DRM) systems in the single container file.

20 Claims, 9 Drawing Sheets

(56) References Cited

U.S. PATENT DOCUMENTS

| | | | |
|---|---|---|---|
| 7,770,229 B2* | 8/2010 | Upendran | 726/30 |
| 7,831,043 B2* | 11/2010 | Lotspiech | 380/201 |
| 8,429,081 B1* | 4/2013 | Dronamraju et al. | 705/59 |
| 2003/0225701 A1 | 12/2003 | Lee et al. | |
| 2005/0086501 A1* | 4/2005 | Woo et al. | 713/189 |
| 2005/0209995 A1 | 9/2005 | Aksu et al. | |
| 2006/0075226 A1 | 4/2006 | Aksu et al. | |
| 2006/0090082 A1 | 4/2006 | Apostolopoulos | |
| 2006/0095382 A1 | 5/2006 | Mahlbacher | |
| 2006/0190290 A1 | 8/2006 | Gomez | |
| 2006/0242074 A1* | 10/2006 | Kokkinen | 705/53 |
| 2006/0259575 A1* | 11/2006 | Upendran et al. | 709/217 |
| 2006/0262074 A1 | 11/2006 | Shimoda | |
| 2007/0005506 A1 | 1/2007 | Candelore | |
| 2007/0107063 A1* | 5/2007 | Eckleder | 726/27 |
| 2007/0180133 A1 | 8/2007 | Vedantham et al. | |
| 2007/0203843 A1* | 8/2007 | Tarkkala et al. | 705/54 |
| 2008/0086779 A1* | 4/2008 | Blake et al. | 726/27 |
| 2008/0123846 A1 | 5/2008 | Candelore | |
| 2008/0250508 A1 | 10/2008 | Montague et al. | |
| 2008/0288788 A1 | 11/2008 | Krig | |
| 2008/0313264 A1 | 12/2008 | Pestoni | |
| 2009/0080664 A1 | 3/2009 | Jung et al. | |

OTHER PUBLICATIONS

"DRM Content Format V2.0", Retrieved at <<http://xml.coverpages.org/OMADRM-DCFv202-20040420.doc>>, Apr. 20, 2004, pp. 1-32.

Wang, Xing, "Standards and Legal Issues", Retrieved at <<http://www.contentguard.com/drmwhitepapers/DRM_standard_activities.pdf>>, Multimedia Security Technologies for Digital Rights Management, Apr. 28, 2006, pp. 1-24.

Ji, et al., "MPEG-4 IPMP Extension for Interoperable Protection of Multimedia Content", Retrieved at <<http://hindawi.com/GetPDF.aspx?doi=10.1155/S1110865704403096>>, EURASIP Journal on Applied Signal Processing, vol. 14, 2004, pp. 2201-2213.

Torres, et al., "Open DRM and the Future of Media", Retrieved at <<http://ieeexplore.ieee.org/stamp/stamp.jsp?tp=&isnumber=&arnumber=4545709>>, IEEE MultiMedia, vol. 15, No. 2, Apr.-Jun. 2008, pp. 28-36.

"Coral Consortium Introduction," Coral Consortium Corporation, 2005, pp. 25.

"Notice of Allowance for Chinese Patent Application No. 200980155365.9" with English summary, Mailed Date: Dec. 5, 2013, 7 pages.

"Office Action for Japanese Patent Application No. 2011-547943" with English summary, Mailed Date: Dec. 26, 2013, 8 pages.

"Office Action for Australian Patent Application No. 2009339304", Mailed Date: Mar. 3, 2014, 3 pages.

"China Second Office Action", Mailed Date: Oct. 29, 2012, Application No. 200980155365.9, pp. 9.

"First Office Action" for Chinese Patent Application No. 200980155365.9 with English summary, Mailed Date: Apr. 27, 2012, 13 pages.

"Second Office Action" for Chinese Patent Application No. 200980155365.9 with English summary, Mailed Date: Oct. 29, 2912, 13 pages.

"Third Office Action" for Chinese Patent Application No. 200980155365.9 with English summary, Mailed Date: Mar. 4, 2013, 7 pages.

"Fourth Office Action" for Chinese Patent Application No. 200980155365.9 with English summary, Mailed Date: Jul. 3, 2013, 8 pages.

"Fifth Office Action" for Chinese Patent Application No. 200980155365.9 with English summary, Mailed Date: Sep. 30, 2013, 7 pages.

"China Third Office Action", Mailed Date: Mar. 4, 2013, Application No. 200980155365.9, Filed Date: Jul. 20, 2011, pp. 6.

"Office Action from the Mexican National Phase", Aug. 14, 2013, Application No. MX/a/2011/007388, pp. 6.

Taban, et. al., "Towards a Secure and Interoperable DRM Architecture", Retrieved at <<http://delivery.acm.org/10.1145/1180000/1179524/p69-taban.pdf?key1=1179524&key2=9317639421&coll=GUIDE&dl=GUIDE&CFID=47490296&CFTOKEN=57432691>>, In Proceedings of the ACM Workshop on Digital Rights Management, Oct. 30, 2006, pp. 69-78.

First Office Action in U.S Patent Application No. 200980155365.9, Dated Apr. 27, 2012, pp. 13.

"China Fourth Office Action", Mailed Date: Jul. 3, 2013, Application No. 200980155365.9, Filed Date: Jul. 20, 2011, pp. 7.

* cited by examiner

MULTIPLE CONTENT PROTECTION SYSTEMS IN A FILE

CROSS-REFERENCE TO RELATED APPLICATION

This application claims the benefit of U.S. Provisional Application No. 61/146,099, filed Jan. 21, 2009, the entirety of which is hereby incorporated by reference herein.

BACKGROUND

Existing digital rights management (DRM) systems protect media content and other files from unauthorized use. To protect the content, metadata specific to one of the DRM systems is stored in the file with the media content. Devices render the content by interpreting the metadata and decrypting the content for presentation to a user. However, content encrypted according to a first DRM system cannot be decrypted by a device supporting only a second DRM system. To enable decryption of the encrypted content by such a device, existing systems create multiple versions of the content each encrypted according to a different DRM system. Alternatively, the content may be decrypted by a device supporting the first DRM system and then re-encrypted by a device supporting the second DRM system. Still other existing systems include a service that provides a rights mapping between the first and second DRM systems.

SUMMARY

Embodiments of the invention support multiple protection systems applied to a single container file. The file containing the content and one or more encryption expressions is received. The content is encrypted by the encryption expressions. A plurality of protection systems are applied to the content using the encryption expressions from the received file. Each of the protection systems protects the content using the same encryption expressions. The file with the content and the applied plurality of protection systems are transmitted to one or more computing devices for decryption. Each of the computing devices decrypts the content using at least one of the applied plurality of protection systems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
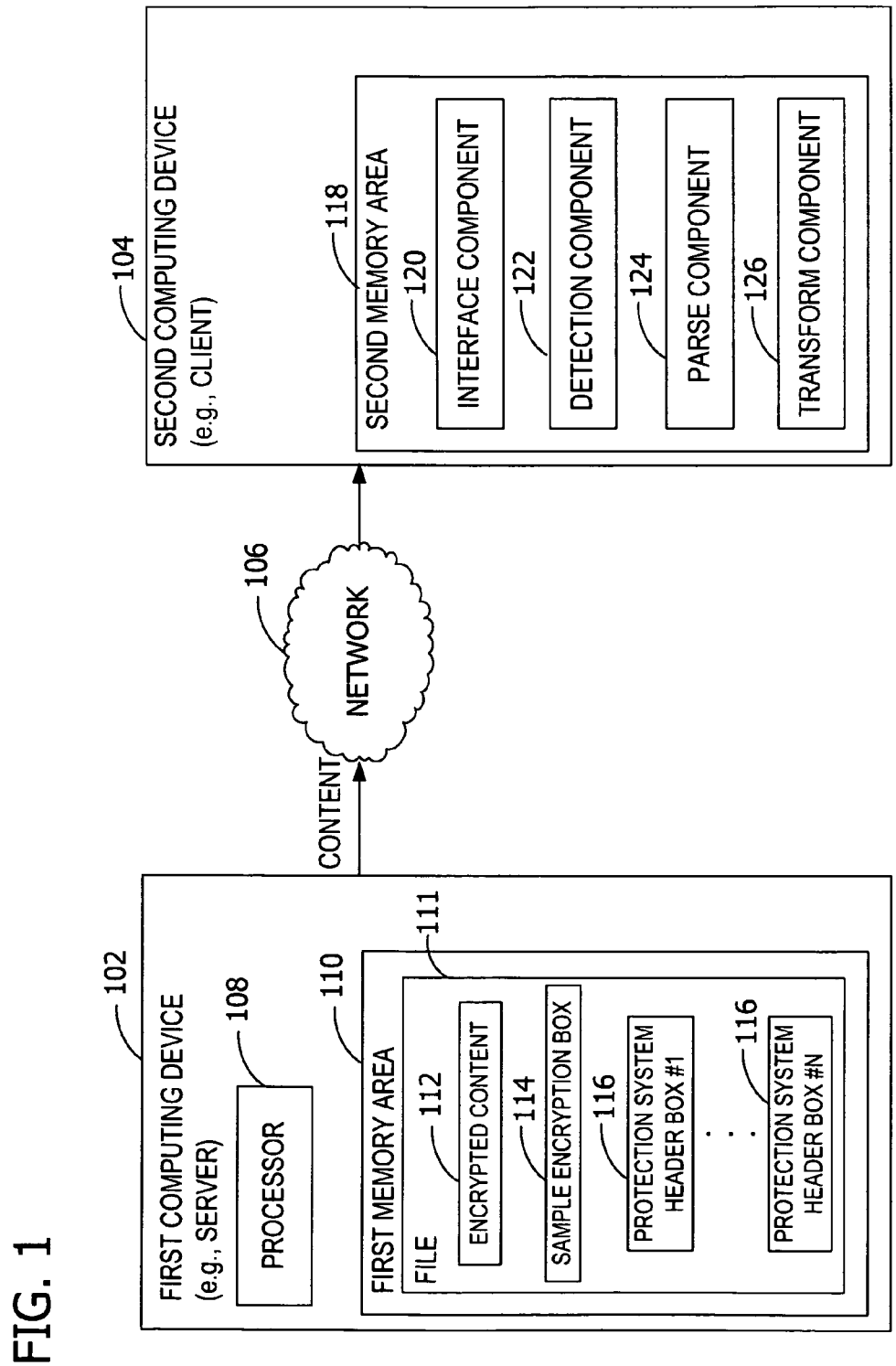
FIG. 1 is an exemplary block diagram illustrating a first computing device providing content to a second computing device over a network.

Referring to the figures, embodiments of the disclosure support, at least, multiple protection systems such as digital rights management (DRM) systems in a file 111 storing media content for presentation to a user. The file 111 stores a single copy of the media content or other content protected by the multiple protection systems. In part to enable such interoperability among the protection systems, the protection systems use or share an encryption algorithm or other encryption method common to the protection systems. Additionally, encryption expressions such as key information used by the protection systems are shared across the protection systems.

Aspects of the disclosure extend the International Organization for Standardization (ISO) base media file format to support the multiple DRM systems in a single container file such as file 111. In some embodiments, the container file includes a sample encryption box 114 and a plurality of protection system header boxes 116, each particular to one or more of the protection systems. The sample encryption box 114 stores or identifies the encryption method common to the protection systems. The protection system header boxes 116 each store data objects used to decrypt the content with the corresponding protection systems. For example, in some embodiments, the data objects in the protection system header boxes 116 are used to acquire other data objects (e.g., from a license server) to decrypt the content. The data objects represent opaque metadata to support the multiple protection systems in the single file, simultaneously.

While aspects of the invention are described with reference to the computing device being the mobile computing device such as a mobile telephone or a netbook or ultraportable, embodiments of the invention are operable with any computing device. For example, aspects of the invention are operable with devices such as digital cameras, digital video cameras, laptop computers, set top boxes, gaming consoles (including handheld gaming consoles), portable music players, personal digital assistants, information appliances, and personal communicators.

Referring again to FIG. 1, an exemplary block diagram illustrates a first computing device 102 providing content to a second computing device 104 over a network 106. In some embodiments, the first computing device 102 is a server, the second computing device 104 is a client device, and the network 106 is the Internet. The first computing device 102 includes at least a first memory area 110 and a processor 108. The first memory area 110 stores the file 111 corresponding to, for example, media content or a media presentation. The media content includes commercial or non-commercial media data such as video, audio, images, text, and/or graphics, or sequences thereof. The first computing device 102 transmits the file 111 with the media content to the second computing device 104 over the network 106.

The exemplary block diagram in FIG. 1 describes content delivery scenarios supported by embodiments of the disclosure including, but not limited to, second session or digital delivery of standard definition or portable media content from an optical disc to a computing device (e.g., portable device or personal computer), progressive download of multimedia content, adaptive streaming over Internet Protocol (IP) networks, or side loading of multimedia content onto portable devices.

The first computing device 102, or other server, represents any known or later-developed sources of media content or information associated therewith including, but not limited to, data storage servers, DRM servers, media content servers (e.g., for music or video downloading, on-demand, broadcasting, or advertising), peer servers, and the like. The first computing device 102 may comprise one or more such devices.

The network 106 represents any digital data transmission infrastructure or technology configured to support known or future-developed media protocol. Exemplary networks include, but are not limited to, the Internet, cellular networks, satellite networks, BLUETOOTH brand wireless networks, and the like.

The second computing device 104 is any computing device, or element of such a computing device, configured to receive data from the first computing device 102. The second computing device 104 may be configured to store and/or present the received data, or alternatively pass the received data to another device for storage and/or presentation.

The first computing device 102 and the second computing device 104 may include components such as transceivers, multiplexers, demultiplexers, encoders, decoders, encrypters, decrypters, and the like.

In some embodiments, the file 111 represents a container file that stores the content in a format supports multiple protection systems. The protection systems correspond to, for example, the DRM systems. In such embodiments, the file 111 includes encrypted content 112, the sample encryption box 114, and the plurality of protection system header boxes 116 such as protection system header box #1 through protection system header box #N. The sample encryption box 114 and the protection system header boxes 116 represent object-oriented building blocks defined by a type identifier and length. A container box contains and groups related boxes. For example, a media data box is a container box holding media content for a presentation, while a movie box is a container box whose sub-boxes define metadata for a presentation. While the sample encryption box 114 and protection system header boxes 116 are shown to be included in a particular box or container box such as illustrated in the figures, the boxes sets forth information that can be conveyed via the box included therewith, or another box therein. Further, the boxes may be considered sub-boxes of other boxes in the file 111.

Each of the plurality of protection system header boxes 116 are associated with one or more of the protection systems. Any quantity of the protection system header boxes 116 may be contained within the file 111. The boxes and protection system are identified by a DRM identifier or other protection system identifier. The sample encryption box 114 identifies a key used to encrypt the encrypted content 112. In some embodiments, the sample encryption box 114 stores a key, key identifier, and/or key mapping information describing a common or standard encryption method across the protection systems. The key may be different for each sample encryption box 114. For example, the standard encryption method includes the Advanced Encryption Standard (AES) with 128-bit key size in counter (CTR) mode. The initialization vector for the AES algorithm is also common to the protection systems. The sample encryption box 114 is shared by the protection system header boxes 116. Each of the protection system header boxes 116 includes metadata for decoding the encrypted content 112, or otherwise granting access to the content, in accordance with one or more of the protection systems.

In an example in which the file 111 corresponds to the ISO base media file format, the protection system header boxes 116 are at nesting level 1 while the sample encryption box 114 is at nesting level 2, in some embodiments.

The second computing device 104 has access to a second memory area 118. The second memory area 118, or one or more computer-readable media, stores computer-executable components for decoding and presenting the media content to a user of the second computing device 104. Exemplary components include an interface component 120, a detection component 122, a parse component 124, and a transform component 126. These components represent exemplary structure for implementing functionality associated with the second computing device 104, although other structures are contemplated for implementing the functionality described herein. Operation of the exemplary components illustrated in FIG. 1 is described below with reference to FIG. 4.

In general, the first memory area 110 is associated with the first computing device 102. For example, in FIG. 1, the first memory area 110 is within the first computing device 102. However, the first memory area 110 or any of the data stored thereon may be associated with any server or other computer, local or remote from the first computing device 102 (e.g., accessible via a network). Similarly, the second memory area 118 is associated with the second computing device 104. For example, in FIG. 1, the second memory area 118 is within the second computing device 104. However, the second memory area 118 or any of the data stored thereon may be associated with any server or other computer, local or remote from the second computing device 104 (e.g., accessible via a network)

The processor 108 includes any quantity of processing units, and is programmed to execute computer-executable instructions for implementing aspects of the disclosure. The instructions may be performed by the processor 108 or by multiple processors executing within the first computing device 102, or performed by a processor external to the first computing device 102 (e.g., by a cloud service). In some embodiments, the processor 108 is programmed to execute instructions such as those illustrated in the figures (e.g., FIG. 3 and FIG. 4).

Figure 2:
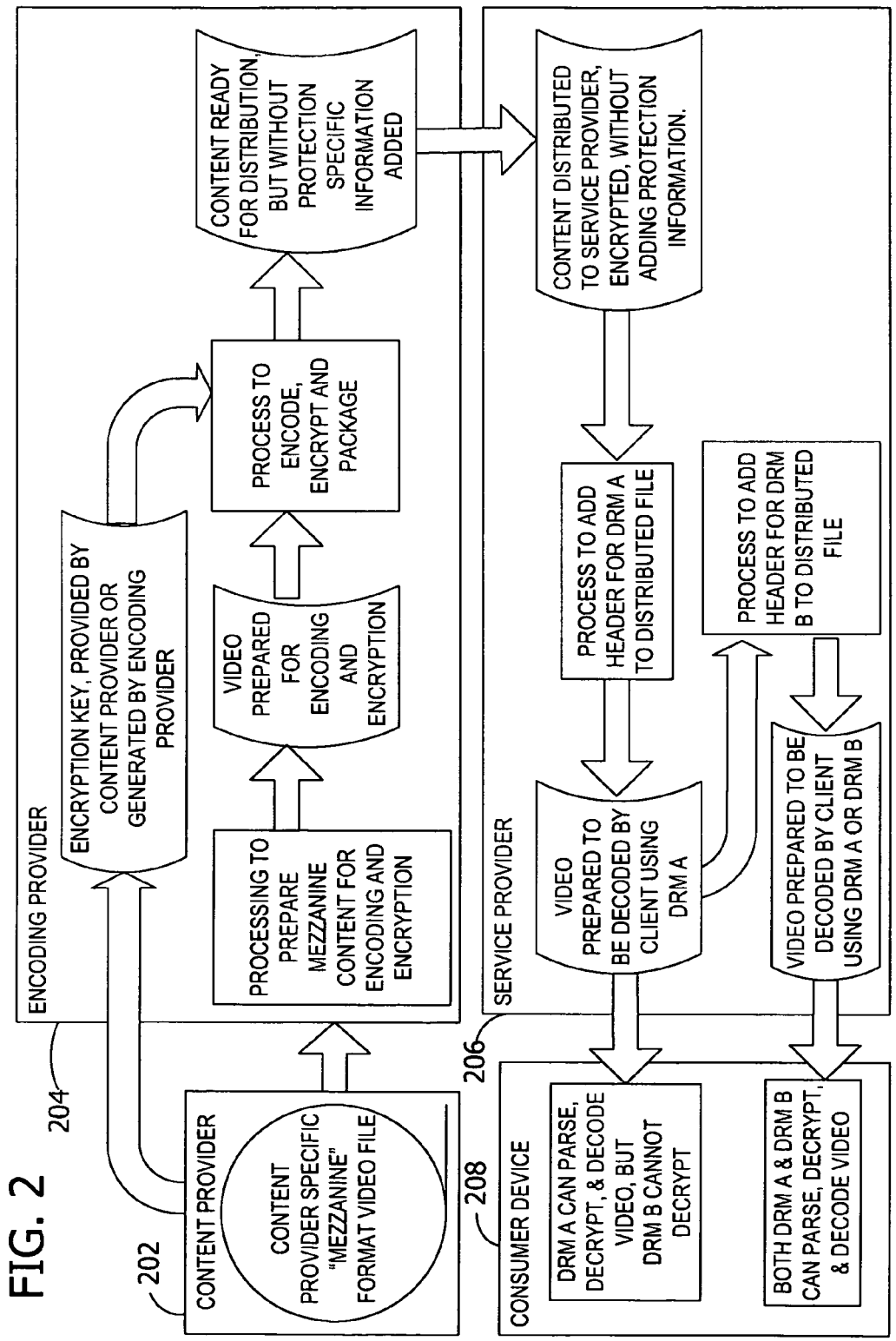
FIG. 2 is an exemplary block diagram illustrating the flow of content from a content provider through an encoding provider and a service provider to a consumer.

Referring again to FIG. 2, an exemplary block diagram illustrates the flow of content from a content provider 202 through an encoding provider 204 and a service provider 206 to a consumer. The diagram of FIG. 2 represents an example of the diagram shown in FIG. 1 in which the service provider 206 corresponds to the first computing device 102 and a consumer device 208 corresponds to the second computing device 104.

The content provider 202 generates a file containing media content. For example, the content provider 202 is a movie studio that produces a video file corresponding to a movie. The generated video file may be in the format known as a mezzanine format, which may be specific to each content provider 202. The content provider 202 transmits the video file to the encoding provider 204. The encoding provider 204 prepares the video file for distribution to one or more of the service providers 206. In this example, the encoding partner performs processing to prepare the mezzanine content for encoding, including encryption in some embodiments, and then performs the encoding and encryption. The encoding and encryption occurs using an encryption key provided by the content provider 202 or generated by the encoding provider 204. The encoded content is ready for distribution, but lacks a protection system (e.g., DRM). The encoded content is sent to the service provider 206.

The service provider 206 receives the encoded content and adds a header (e.g., one of the protection system header boxes 116) for DRM A to the video file. The video file with the applied protection system may be sent to the consumer device 208 or other devices where it is capable of being decrypted only by DRM A. Alternatively or in addition, the service provider 206 may also add another header (e.g., another one of the protection system header boxes 116) for DRM B to the video file. At this point, the video file is capable of being decoded using DRM A or DRM B. The video file is transmitted to the consumer, where the consumer device 208 may parse, decrypt, and decode the video file using DRM A or DRM B.

In an example, the content is a movie, and the user attempts to play the movie on Device One which support DRM A. Playback software on Device One determines that the movie is encrypted. The playback software finds the protection specific header box corresponding to DRM A. The playback software uses the information contained in the protection specific header box to contact a license server and retrieve a license for the movie. The retrieved license may be stored within the protection specific header box for DRM A (e.g., in extra space therein). The movie is then decrypted using DRM A and presented to the user.

In a further example, the user then copies the movie to Device Two which supports DRM B. The playback software on Device Two determines that the movie is encrypted. The playback software finds the protection specific header box corresponding to DRM B. The playback software uses the information contained in the protection specific header box to contact a license server and retrieve a license for the movie. The retrieved license may be stored within the protection specific header box for DRM B (e.g., in extra space therein). The movie is then decrypted using DRM B and presented to the user.

Figure 3:
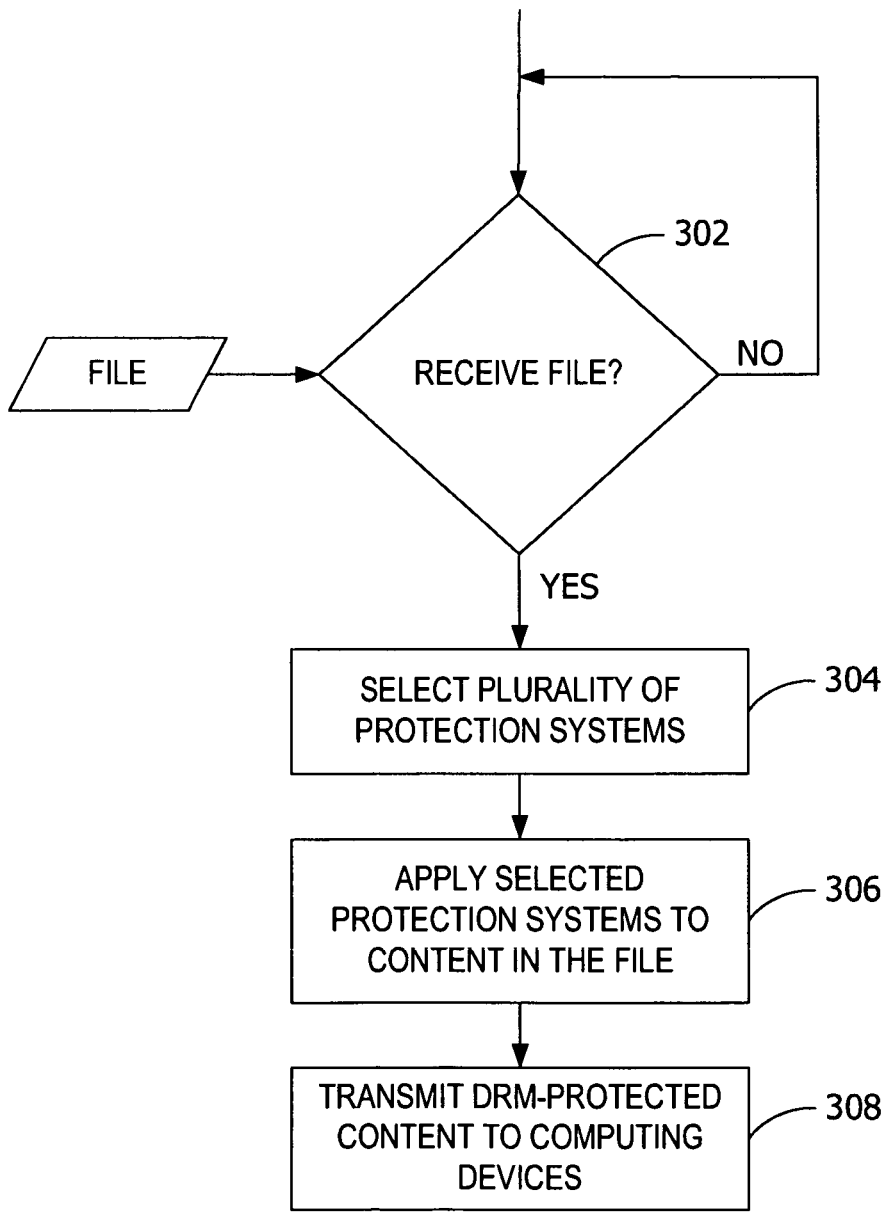
FIG. 3 is an exemplary flow chart illustrating the application of protection systems to content.

Referring next to FIG. 3, an exemplary flow chart illustrates the application of protection systems to content. A computing device, such as the service provider 206 in FIG. 2, determines at 302 if a file has been received. The file includes media content and one or more encryption expressions. The media content is encrypted according to the encryption expressions. In some embodiments, the encryption expressions include, or include metadata describing, one or more encryption keys, key identifiers, and key mapping information. In other embodiments, the encryption expressions include data objects for obtaining one or more of the encryption keys, key identifiers, and key mapping information from another location (e.g., a web service). The encryption expressions may be stored in, for example, one or more of the protection system header boxes 116 and/or the sample encryption box 114 illustrated in FIG. 1.

After the file with the media content is received at 302, a plurality of protection systems is selected at 304. For example, the protection systems may be selected based on the intended recipients of the file, or represent a default selection of protection systems commonly used by consumer devices 208. At 306, the selected protection systems are applied to the content in the file using one or more of the encryption expressions to create DRM-protected content. For example, applying the protection systems includes adding or embedding metadata for the protection systems to the file. The metadata describes the protection systems and enables decryption of the content. In some embodiments, the metadata includes a rights object or license information (or a reference to the license information) related to the protection systems, along with a decryption key associated with the protection system.

The protection systems are applied to the content without creating additional copies of the content. As a result, a single container file (e.g., file 111) comprises the content and the plurality of selected, applied protection systems.

The DRM-protected content is transmitted to one or more computing devices at 308. The computing devices decrypt the content using at least one of the applied protection systems supported by the computing devices. Alternatively or in addition, the DRM-protection content is stored in a memory area for access by the computing devices.

In the example of FIG. 1, applying the protection systems includes defining one of the protection system header boxes 116 for each of the selected protection systems. The defined protection system header boxes 116 are included in the file. In this example, the sample encryption box 114 includes key information including key mapping information and a key identifier. The protection systems are applied to the content using the key information identified in the sample encryption box 114.

Figure 4:
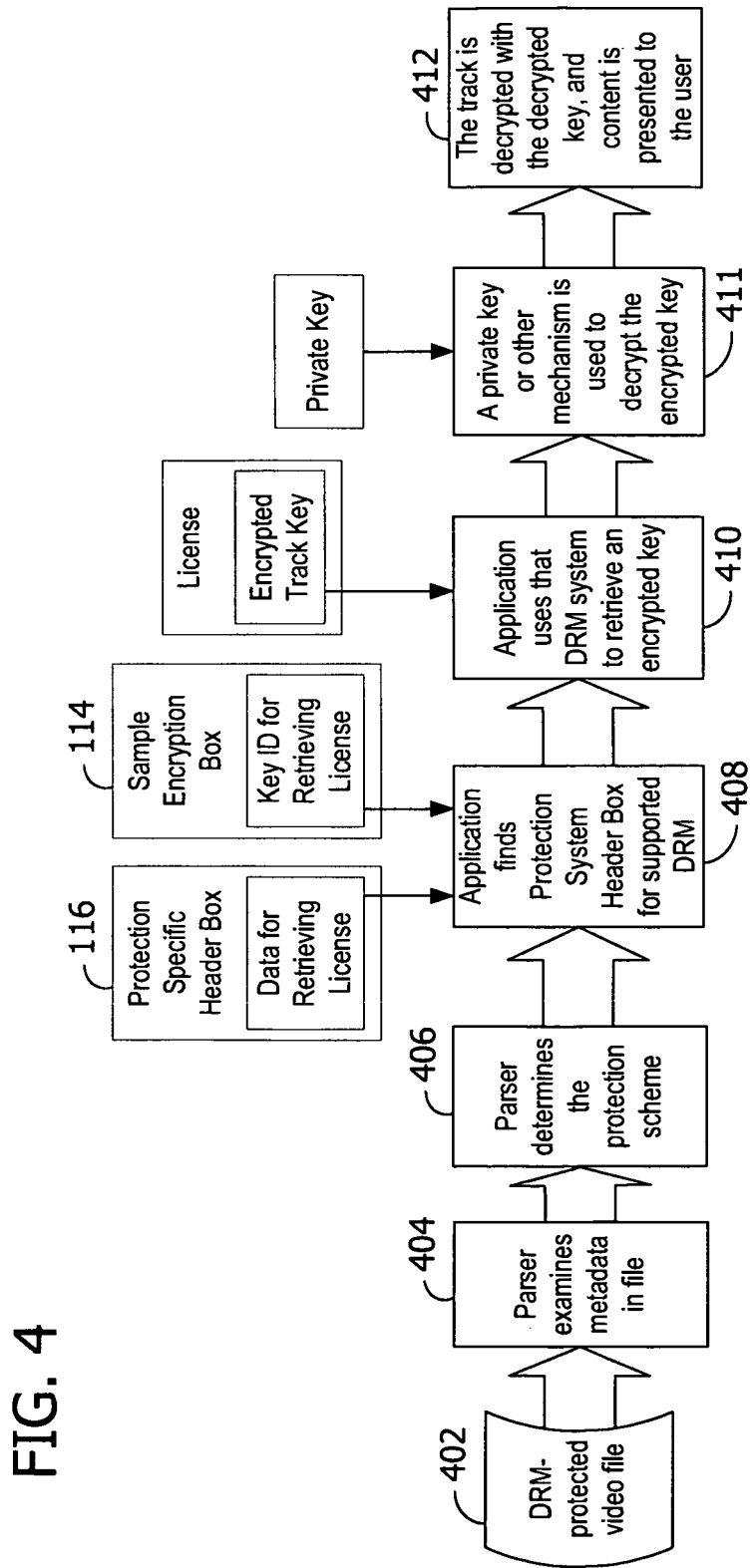
FIG. 4 is an exemplary flow chart illustrating the decoding of content for presentation on a computing device.

Referring next to FIG. 4, an exemplary flow chart illustrates the decoding of content for presentation on a computing device. A DRM-protected video file is received by the computing device at 402. A parser executing on the computing device examines metadata in the received file at 404 to determine that the file has a protection system applied thereto at 406. For example, the parser determines that the file has been protected by a stream type of encrypted video (e.g., "encv") or encrypted audio (e.g., "enca") if the file is in Moving Picture Experts Groups-4 (MP4) format. In such an example, the parser examines a scheme information box or scheme type box within a protection scheme information box to determine whether a track within the file is encrypted in accordance with aspects of the disclosure. The track corresponds to a collection of related samples in the file. In some embodiments, the parser finds in the scheme type box a four-character code and a version number identifying the protection scheme.

An application program executing on the computing device searches the protection system header boxes 116 in the received video file at 408 to find the protection system header box 116 that corresponds to a protection system supported by the computing device. The protection system header box 116 is used to ensure that any license(s) for decrypting the content is available on the computing device before playback begins. The key identifier is obtained from the sample encryption box 114. The application program obtains data from the protection system header box 116 corresponding to a supported protection system that enables the application program to obtain a license from a license server that corresponds to that key identifier at 410. The application then extracts an encrypted key from the license, and decrypts the key at 411. Decryption of the encrypted key (e.g., a private key, an individualized key, or other asymmetric key) may be performed using known public-private key systems, in some embodiments. The decrypted key is used to decrypt the track, and the decrypted content is presented to the user at 412.

In some embodiments, the operations illustrated in FIG. 4 are implemented using computer-executable components stored on one or more computer-readable media. For example, the components illustrated in FIG. 1 perform the operations. In such an example, the interface component 120 receives the file containing content and one or more encryption expressions. The content has been encrypted by at least one of the encryption expressions. The content further has a plurality of protection systems applied thereto, and the file includes metadata for each of the plurality of protection systems. The plurality of protection systems share access to the encryption expressions. Further, the content is encoded according to an encryption algorithm. The plurality of protection systems shares the encryption expressions and the encryption algorithm.

The detection component 122 examines a scheme information box in the file to determine whether the content is protected by a protection scheme in accordance with aspects of the disclosure. The detection component 122 determines which protection systems are supported by the computing device, and selects one of the supported protection systems. The parse component 124 obtains, from the metadata, license information for the protection system selected by the detection component 122. The transform component 126 decodes and decrypts the content based on the license information obtained by the parse component 124 and based on the encryption expressions. The interface component 120 presents the decoded content to a user.

Referring next to FIG. 5, FIG. 6, FIG. 7, FIG. 8, and FIG. 9, exemplary block diagrams illustrate an example application of embodiments of the disclosure to extend a media file format to support a plurality of protection systems in a single container file. The examples below refer to various known specifications including, but not limited to, ISO 14496-12, ISO 14496-14, ISO 14496-1, ISO 14496-10, ISO 14496-3, and ISO/IEC 639-3:2007, all of which are hereby incorporated by reference herein for all purposes. While the examples next described are directed to the ISO base media file format and/or MP4 formats, embodiments of the invention are applicable to other file formats.

For the purposes of the following examples, the file format may be referred to as a movie. The movie is logically divided into tracks. Each track represents a timed sequence of media (e.g., frames of video). Within each track, each timed unit or frame of data is called a sample (e.g., a frame of video or audio, a time-contiguous series of video frames, or a time-contiguous compresses section of audio). Samples are implicitly numbered in sequence. A frame of audio may decompress into a sequence of audio samples. Each track has one or more sample descriptions. Each sample in the track is tied to a description by reference. The description defines how the sample may be decoded (e.g. identifies the compression algorithm used).

In some embodiments, neither the physical structure of the file nor the layout of the physical media is tied to the time ordering of the media content. For example, frames of video need not be laid down in the file in time order, although the frames might be laid down in such a way.

The data within the file is encapsulated in boxes. The metadata, including metadata defining the placement and timing of the media content, is contained in the boxes. The media content (e.g., frames of video) is referred to by the metadata. The media content may be in the same file (e.g., contained in one or more boxes) or can be in other files. The metadata permits referring to other files by means of references such as hyperlinks (e.g., uniform resource locators).

In the examples below, embodiments of the invention use a class-based notation with inheritance. The classes are consistently represented as structures on the disk and on the wire as follows: the fields of a class appear in the disk structure in the same order the fields are specified, and the fields in a parent class appear before the fields for derived classes. Further, when a box contains other boxes as children, the child boxes appear after any explicitly specified fields and can appear in any order (e.g., sibling boxes can be re-ordered without breaking compliance to the specification).

Figure 5:
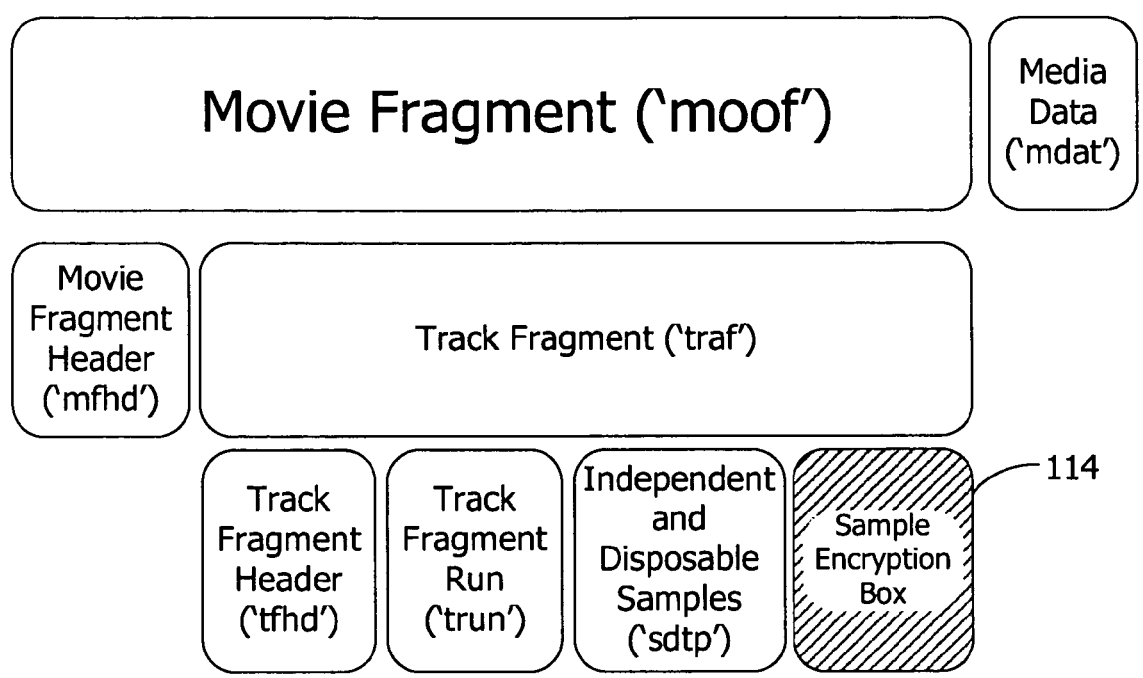
FIG. 5 is an exemplary block diagram illustrating an exemplary structure representing a fragmented file structure.
Figure 6:
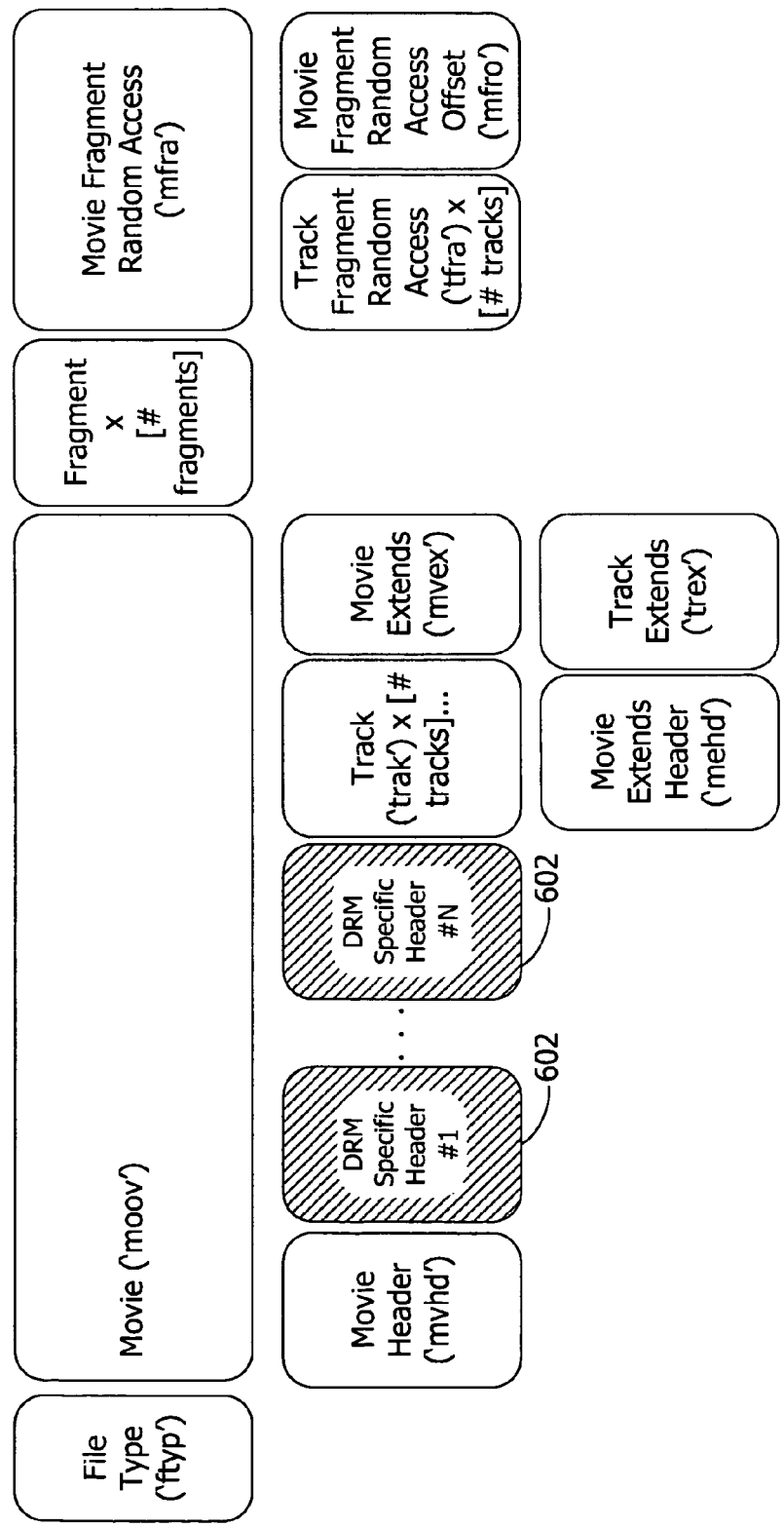
FIG. 6 is an exemplary block diagram illustrating an exemplary structure representing fragmented file organization.
Figure 7:
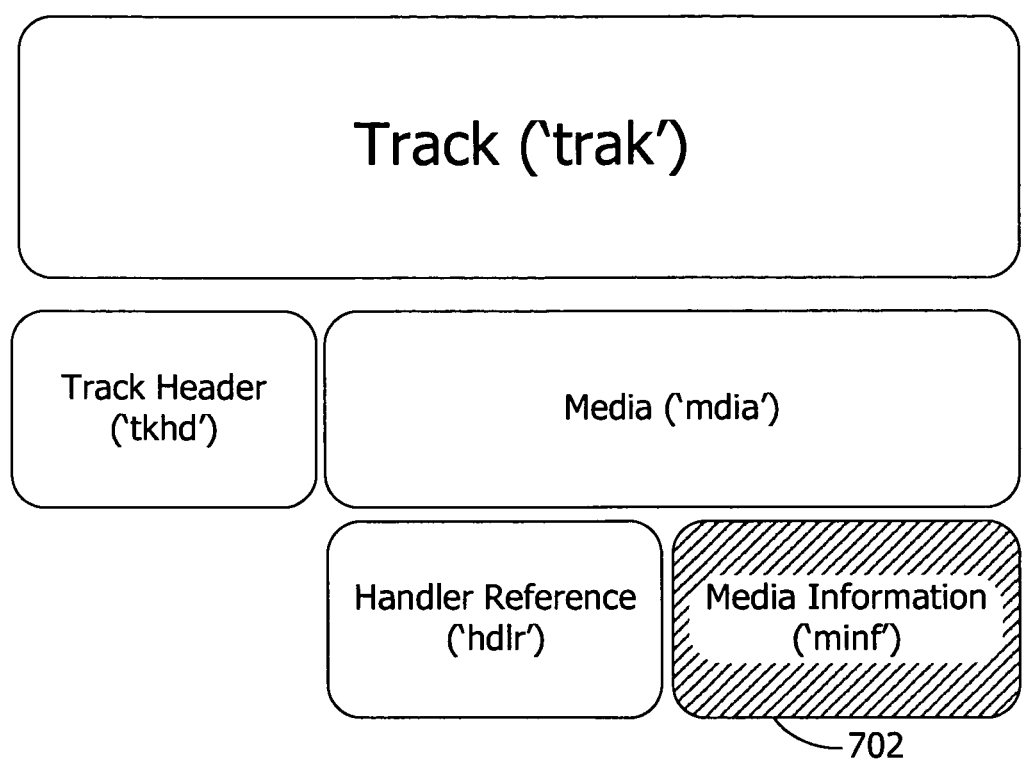
FIG. 7 is an exemplary block diagram illustrating an exemplary structure for storing a track box.

Referring again to FIG. 5, an exemplary block diagram illustrates an exemplary structure representing a fragmented file structure in accordance with embodiments of the disclosure. The fragmented file structure includes two top-level boxes: a movie fragment box ("moof") for metadata, and a media data ("mdat") box for samples. In this example, the sample encryption box 114 shared by the protection systems is shown as a sub-box of the movie fragment box. The sample encryption box 114 includes sample-specific encryption data. In the example of FIG. 5, the sample encryption box 114 has a type universally unique identifier (UUID), and is part of a track fragment container box or a sample table container box.

An example syntax for the sample encryption box 114 is shown below.

```
aligned(8) class SampleEncryptionBox extends FullBox('uuid',
extended_type=1, version=0, flags=0)
{
    unsigned int(8)      AlgorithmID;
    GUID                 KID;
    unsigned int(32)     sample_count;
    {
        unsigned int(64) SampleIdentifier;
    }[ sample_count ]
}
```

The AlgorithmID is the identifier of the encryption algorithm (e.g., AES 128-bit in CTR mode) used to encrypt the track. KID is a key identifier that identifies the key for decrypting samples referred to by the sample encryption box 114. In this example, there is one AlgorithmID and one KID in the sample encryption box 114, meaning that there is one key per track. In other embodiments, there are multiple keys per track to, for example, allow for key rotation for broadcast content including sections of clear content within an encrypted track and to allow for insertion of content encrypted with different parameters (e.g., editing, advertisement insertion, etc).

Sample_count is the quantity of sample in this track or track fragment. SampleIdentifier is used to form an initialization vector for decrypting the sample. The AES CTR mode encryption used to encrypt the sample data uses the SampleIdentifier as the high 64 bits and a simple block counter (e.g., starting at zero from the beginning of the sample) as the low 64 bits of the 128 bit value encrypted with the AES cipher. In some embodiments, the SampleIdentifiers for a given key are unique for each sample, and the initial sample identifier is randomly generated. For each protected sample added to the file, the SampleIdentifier is incremented to provide entropy and ensure that the SampleIdentifiers are unique.

Referring again to FIG. 6, an exemplary block diagram illustrates an exemplary structure representing fragmented file organization. The movie fragment includes a particular segment of a particular sequence of media data. In this example, the disk format is fragmented MP4. The file type box in FIG. 6 identifies the file as being encoded according to embodiments of the disclosure to make the file type box fixed length. The plurality of DRM specific header boxes 602 such as DRM specific header box #1 through DRM specific header box #N (sub-boxes of the movie box) correspond to the plurality of protection system headers boxes illustrated in FIG. 1. The DRM specific header boxes 602 contain data including, but not limited to, a license server reference (e.g., uniform resource locator), a list of key identifiers used by the file, embedded licenses, and the like. The DRM specific header boxes 602 may also store or pre-load any quantity of embedded licenses (e.g., from the service provider 206 prior to the content being made available to the user).

In some embodiments, a plurality of DRM specific header boxes 602 exists for the same protection system. For example, a single file is shared by two different services both using the same protection system but each using different header parameters (e.g., different service identifiers, different license acquisition links, etc.).

An example syntax for the DRM specific header boxes 602 is shown below.

```
aligned(8) class DrmSpecificHeaderBox extends FullBox('uuid',
    extended_type=1, version=0, flags=0)
{
    GUID                  DRMID;
    unsigned int(32)      DataSize;
    unsigned int(8) [DataSize]  Data;
}
```

DRMID specifies a UUID that uniquely identifies the protection system to which this header belongs. DataSize specifies the size in bytes of the data member. Data holds the data specific to the protection system.

Figure 8:
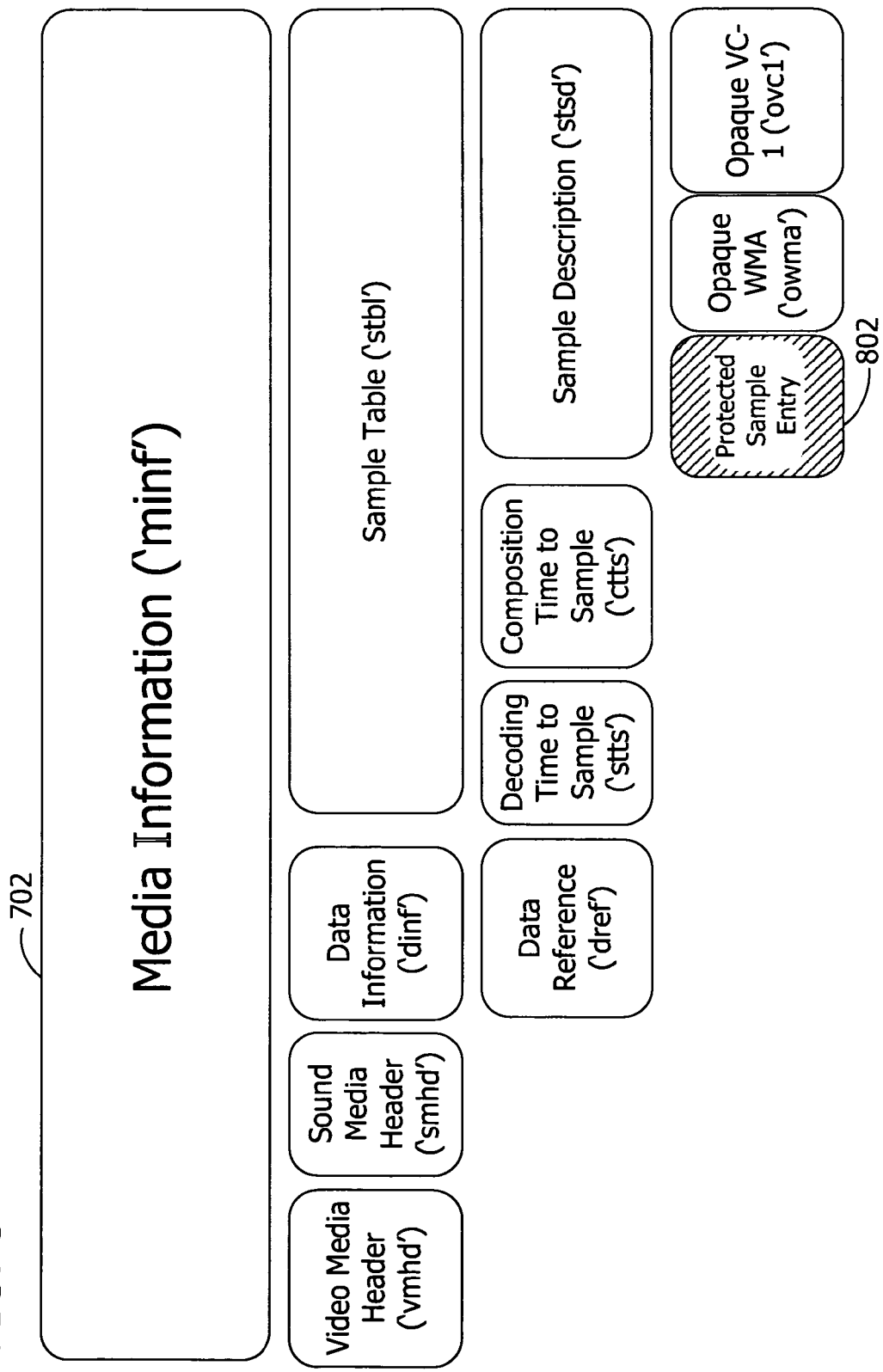
FIG. 8 is an exemplary block diagram illustrating an exemplary structure for storing for storing a media information box.
Figure 9:
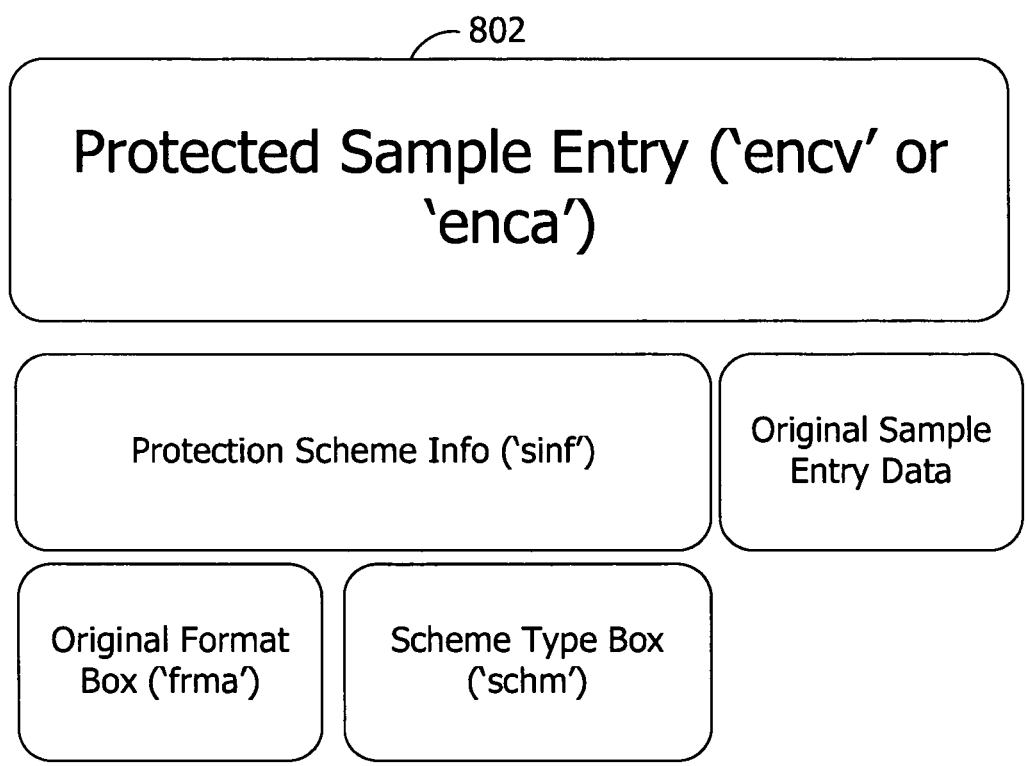
FIG. 9 is an exemplary block diagram illustrating an exemplary structure for storing a protected sample entry box.

Referring again to FIG. 7, an exemplary block diagram illustrates an exemplary structure for storing a track box. The track box acts as a container box storing boxes such as a media information box 702 as shown in FIG. 8.

Referring again to FIG. 8, an exemplary block diagram illustrates an exemplary structure for storing the media information box 702. The media information box 702 acts as a container box for storing boxes such as a sample description box ("stsd"). The sample description box stores boxes including a protected sample entry box 802, which stores the encrypted sample content. The sample entry box is shown again in FIG. 9.

Referring again to FIG. 9, an exemplary block diagram illustrates an exemplary structure for storing the protected sample entry box 802. The protected sample entry box 802 acts as a container box storing boxes such as a protection scheme information box. In contrast to the existing ISO base media file format, the protection scheme information box is stored in place of the sample entry in the sample description box to denote that the stream is encrypted. The protection scheme info box contains a scheme type box ('schm') so that the scheme is identifiable.

Additional Examples

The file format described herein represents a minimum file format that includes support for late binding of alternate audio and video content. This enables computing devices supporting legacy or emerging coders/decoders (codecs) to late-bind those streams at playback without burdening devices without support of those codecs with the additional download cost.

Embodiments of the disclosure support both fragmented and nonfragmented container files. For example, for adaptive streaming, the fragmented file format is used, but for digital copy from an optical disc, the nonfragmented file format is used.

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for supporting the plurality of protection systems within a single container file in accordance with the ISO Base Media File Format, and exemplary means for storing the metadata for the plurality of protection systems in a single container file as an extension to the ISO Base Media File Format.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method comprising:
receiving a file containing encrypted content and one or more encryption expressions, said encrypted content being encrypted by the one or more encryption expressions;
using the one or more encryption expressions to apply a plurality of protection systems to the encrypted content to create a DRM-protected file from the received file, each of the plurality of protection systems defining a corresponding protection system header box, each protection system header box containing license information that enables decryption of the encrypted content, each protection system header box being included in the received file; and
transmitting the DRM-protected file to one or more computing devices for decryption of the encrypted content, wherein the one or more computing devices search the protection system header boxes to find the protection system header box that corresponds to a protection system supported by the one or more computing devices, the decryption determining the license information contained in the found protection system header box that corresponds to the protection systems supported by the one or more computing devices, the determined license information enabling retrieval of a decryption key to decrypt the encrypted content.

2. The method of claim 1, wherein applying the plurality of protection systems to the encrypted content comprises adding metadata for each of the plurality of protection systems to the received file, said metadata defining one or more of the following: a decryption key, a rights object, and license information.

3. The method of claim 1, wherein receiving the file comprises receiving a file containing key mapping information, said encrypted content being encrypted using said key mapping information.

4. The method of claim 1, further comprising embedding the license information into the protection system header box.

5. The method of claim 1, further comprising embedding in the protection system header box a reference to the license information.

6. The method of claim 1, wherein applying the plurality of protection systems to the content comprises applying the plurality of protection systems to said encrypted content without creating another copy of the encrypted content.

7. The method of claim 1, wherein the file further contains a sample encryption box that identifies an encryption method common to the plurality of protection systems.

8. The method of claim 1, wherein the one or more computing devices obtain a license from a license server, the license enabling decryption of the encrypted content.

9. The method of claim 7, wherein the sample encryption box includes a key identifier that identifies an encryption key, the sample encryption box being shared across the protection system header boxes.

10. A system for extending a media file format to support multiple protection systems in a single container file, said system comprising:
a memory area for storing at least a file containing encrypted content; and
a processor programmed to:
receive the file containing the encrypted content and one or more encryption expressions, said encrypted content being encrypted by the one or more encryption expressions;
use the one or more encryption expressions to apply a plurality of protection systems to the encrypted content to create a DRM-protected file from the received file, each of the plurality of protection systems defining a corresponding protection system header box, each protection system header box containing license information that enables decryption of the encrypted content, each protection system header box being included in the received file; and
transmit the DRM-protected file to one or more computing devices for decryption of the encrypted content, wherein the one or more computing devices search the protection system header boxes to find the protection system header box that corresponds to a protection system supported by the one or more computing devices, the decryption determining the license information contained in the found protection system header box that corresponds to the protection system supported by the one or more computing devices, the determined license information enabling retrieval of a decryption key to decrypt the encrypted content.

11. The system of claim 10, wherein applying the plurality of protection systems to the encrypted content comprises adding metadata for each of the plurality of protection systems to the received file, said metadata defining one or more of the following: a decryption key, a rights object, and license information.

12. The system of claim 10, wherein the received file contains key mapping information, said encrypted content being encrypted using said key mapping information.

13. The system of claim 10, wherein the processor is further programmed to embed the license information in the protection system header box.

14. The system of claim 10, wherein the processor is further programmed to embed in the protection system header box a reference to the license information.

15. The system of claim 10, wherein the file further contains a sample encryption box that identifies an encryption method common to the plurality of protection systems.

16. The system of claim 15, wherein the sample encryption box includes a key identifier that identifies an encryption key, the sample encryption box being shared across the protection system header boxes.

17. One or more computer devices storing computer-executable instructions that when executed by at least one processor causes the at least one processor to perform operations comprising:
receiving a file containing encrypted content and one or more encryption expressions, said encrypted content being encrypted by the one or more encryption expressions;
using the one or more encryption expressions to apply a plurality of protection systems to the encrypted content to create a DRM-protected file from the received file, each of the plurality of protection systems defining a corresponding protection system header box, each protection system header box containing license information that enables decryption of the encrypted content, each protection system header box being included in the received file; and transmitting the DRM-protected file to one or more other computing devices for decryption of the encrypted content, wherein the one or more other computing devices search the protection system header boxes to find the protection system header box that corresponds to a protection system supported by the one or more other computing devices, the decryption determining the license information contained in the found protection system header box that corresponds to the protection system supported by the one or more other computing devices, the determined license information enabling retrieval of a decryption key to decrypt the encrypted content.

18. The computer devices of claim 17, storing further computer-executable instructions that when executed by the at least one processor causes the at least one processor to further perform operations comprising:

embedding the license information into the protection system header boxes.

19. The computer devices of claim 17, wherein applying the plurality of protection systems to the content comprises applying the plurality of protection systems to said encrypted content without creating another copy of the encrypted content.

20. The computer devices of claim 17, wherein the one or more other computing devices obtain a license from a license server, the license enabling decryption of the encrypted content.

* * * * *